(12) United States Patent
Althaus et al.

(10) Patent No.: US 11,378,420 B2
(45) Date of Patent: Jul. 5, 2022

(54) CAPACITIVE SENSOR GUARD DIAGNOSTICS FROM REDUNDANT COUPLING MEASUREMENT

(71) Applicant: IEE INTERNATIONAL ELECTRONICS & ENGINEERING S.A., Echternach (LU)

(72) Inventors: Frank Althaus, Saarbrücken (DE); Thomas Faber, Schweich (DE); Erik Holzapfel, Prüm (DE); Michael Pütz, Trier (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 0 days.

(21) Appl. No.: 17/299,063

(22) PCT Filed: Nov. 27, 2019

(86) PCT No.: PCT/EP2019/082735
§ 371 (c)(1),
(2) Date: Jun. 2, 2021

(87) PCT Pub. No.: WO2020/114858
PCT Pub. Date: Jun. 11, 2020

(65) Prior Publication Data
US 2021/0356298 A1   Nov. 18, 2021

(30) Foreign Application Priority Data
Dec. 3, 2018 (LU) .................... LU101023

(51) Int. Cl.
*H02J 7/00* (2006.01)
*G01D 5/241* (2006.01)
(Continued)

(52) U.S. Cl.
CPC .......... *G01D 5/241* (2013.01); *B60R 16/027* (2013.01); *B62D 1/046* (2013.01); *B60Q 9/00* (2013.01)

(58) Field of Classification Search
CPC ............................. G01D 5/241; B60R 16/027
(Continued)

(56) References Cited

U.S. PATENT DOCUMENTS 6,161,070 A    12/2000  Jinno et al.
8,354,936 B2    1/2013  Ootaka
(Continued)

FOREIGN PATENT DOCUMENTS

WO    2017129552 A1    8/2017

OTHER PUBLICATIONS

J. R. Smith et al., "Electric Field Sensing for Graphical Interfaces", published in IEEE Computer Graphics and Applications, 18(3), dated May/Jun. 1998, pp. 54-60.
(Continued)

*Primary Examiner* — Suchin Parihar
(74) *Attorney, Agent, or Firm* — Reising Ethington P.C.

(57) ABSTRACT

A method of operating a capacitive sensing device for diagnosing a galvanic connection of at least one guard electrode. The capacitive sensing device includes at least one sense-guard capacitive sensor and a capacitive measurement circuit. The sense-guard capacitive sensor includes a first electrically conductive sense electrode and a first electrically conductive guard electrode and at least a second electrically conductive sense electrode, which is galvanically separated from the first sense electrode, and at least a second electrically conductive guard electrode. Each of the
(Continued)

guard electrodes is proximally arranged to at least one of the sense electrodes and is galvanically separated from each of the sense electrodes. The method uses a calculated difference of imaginary parts of complex sense currents resulting from coupling mode measurements between at least two of the sense electrodes for assessing a status of the galvanic connection of the guard electrodes.

10 Claims, 5 Drawing Sheets

(51) Int. Cl.
  *B60R 16/027* (2006.01)
  *B62D 1/04* (2006.01)
  *B60Q 9/00* (2006.01)

(58) Field of Classification Search
  USPC .......................................................... 324/679
  See application file for complete search history.

(56) References Cited

U.S. PATENT DOCUMENTS

| | | | |
|---|---|---|---|
| 2003/0080744 A1* | 5/2003 | Goldfine | G01V 3/104 |
| | | | 324/345 |
| 2010/0315251 A1 | 12/2010 | Ootaka | |
| 2013/0120052 A1* | 5/2013 | Siska | G01R 27/2605 |
| | | | 327/517 |
| 2016/0075373 A1* | 3/2016 | Fukukawa | B62D 15/021 |
| | | | 701/42 |
| 2016/0306061 A1* | 10/2016 | Lamesch | G01V 3/08 |
| 2017/0305376 A1* | 10/2017 | Lamesch | G01D 5/24 |
| 2019/0047502 A1 | 2/2019 | Lamesch | |
| 2020/0341041 A1* | 10/2020 | Lamesch | G01D 5/24 |

OTHER PUBLICATIONS

International Search Report corresponding to International Application No. PCT/EP2019/082735, dated Dec. 18, 2019, 4 pages.
Written Opinion corresponding to International Application No. PCT/EP2019/082735, dated Dec. 18, 2019, 5 pages.

\* cited by examiner

CAPACITIVE SENSOR GUARD DIAGNOSTICS FROM REDUNDANT COUPLING MEASUREMENT

TECHNICAL FIELD

The invention relates to a method of operating a capacitive sensing device for diagnosing a galvanic connection of guard electrodes, a capacitive sensing device using such method, a vehicle steering wheel comprising such capacitive sensing device, and a software module for automatically carrying out such method.

BACKGROUND

Capacitive sensors and capacitive measurement and/or detection devices employing capacitive sensors have a wide range of applications, and are among others used for the detection of the presence and/or the position of a conductive body or body portion in the vicinity of an antenna electrode. As used herein, the term "capacitive sensor" designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode—which may be identical with or different from emitting antenna electrodes—at which the influence of an object or living being on the electric field is detected.

In the field of automotive vehicle sensor application it is known to employ capacitive sensors for providing input to Automatic Driver Assistance Systems (ADAS), for instance for the purpose of a seat belt reminder (SBR) system or an activation control for an auxiliary restraint system (ARS). Sensed signals can serve as a basis for making decisions by an ADAS, for instance for a decision to deploy an air bag system to a specific vehicle seat or not.

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies on oscillating voltage signal to the antenna electrode, whereby a minute electric field is produced around the antenna electrode. Jinno proposes detecting the presence or absence of a passenger in the seat based on the amplitude and the phase of the current flowing to the antenna electrode.

Another example for the use of capacitive sensors in an automotive vehicle application is the so-called Hands off Detection (HoD) system, in which one or more sensors provide information about whether a driver has his hands on a steering wheel of a vehicle or not. This information can be transferred to an ADAS such as an Adaptive Cruise Control (ACC), which, based on the provided sensor signal, can alert the driver and remind him or her to take control of the steering wheel again. In particular, such HoD systems can be used in support to fulfill a requirement of the Vienna convention that the driver must remain in control of the vehicle at all times. HoD systems may as well be employed in a parking assistance system or an ADAS that is configured for evaluating a driver activity at high speed.

In some (so-called "loading mode") capacitive sensors, the at least one antenna electrode serve at the same time as sensing electrode. In this case, a measurement circuit determines a current flowing into the at least one antenna electrode in response to an oscillating voltage being applied to them. The relationship of voltage to current yields the complex impedance between the at least one antenna electrode and ground potential. In an alternative version of capacitive sensors ("coupling mode" capacitive sensors), the transmitting antenna electrode(s) and the sensing electrode(s) are separate from one another. In this case, the measurement circuit determines a current or voltage that is induced in the sensing electrode when at least one transmitting antenna electrode is being operated.

Different capacitive sensing mechanisms are for instance explained in the technical paper entitled "Electric Field Sensing for Graphical Interfaces" by J. R. Smith et al., published in IEEE Computer Graphics and Applications, 18(3): 54-60, 1998, which shall hereby be incorporated by reference in its entirety with effect for the jurisdictions permitting incorporation by reference.

The paper describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", which is alternatively referred to as "coupling mode", an oscillating voltage signal is applied to the transmitting electrode, building up an electric field to a receiving electrode, and the displacement current induced at the receiving electrode is measured. The measured displacement current depends on the body being sensed. In the "transmit mode", the transmit electrode is put in contact with the user's body, which then becomes a transmitter relative to a receiver, either by direct electrical connection or via capacitive coupling.

The capacitive coupling strength may, for instance, be determined by applying an alternating voltage signal to an antenna electrode and by measuring the current flowing from that antenna electrode either towards ground (in the loading mode) or into a second antenna electrode (in the coupling mode). This current may be measured by a transimpedance amplifier, which is connected to the sensing electrode and which converts the current flowing into the sensing electrode into a voltage proportional to this current.

Some capacitive sensors are designed as sense-only capacitive sensors having a single sense electrode. Also, quite often capacitive sensors are used that comprise a sense electrode and a so-called "guard electrode" that are proximally arranged and mutually galvanically insulated from each other. This technique of "guarding" is well known in the art and is frequently used for intentionally masking, and thus shaping, a sensitivity regime of a capacitive sensor. To this end, the guard electrode is kept at the same electric AC potential as the sense electrode. As a result, a space between the sense electrode and the guard electrode is free of an electric field, and the guard-sense capacitive sensor is insensitive in a direction between the sense electrode and the guard electrode.

By way of example, patent document U.S. Pat. No. 8,354,936 B2 describes a capacitive passenger detector for a vehicle. The capacitive passenger detector includes a main electrode, a sub-electrode and a guard electrode. The main electrode and the sub-electrode are separated apart from each other, and disposed in a seat of a vehicle. The guard electrode is disposed between the main electrode and a body of the vehicle, and separated apart from the main electrode. A sensitive characteristic measurement unit is configured for applying an alternating voltage signal to the main electrode, the sub-electrode and the guard electrode selectively or totally and for converting a current generated in the main electrode, the sub-electrode and the guard electrode to a voltage, respectively. The capacitive passenger detector further comprises a controller that defines a current flowing through the guard electrode to be a reference current when a voltage of the main electrode and a voltage of the guard electrode have the same potential. The controller defines a current flowing direction of the current flowing through the guard electrode to be a negative direction when the voltage of the main electrode is higher than the voltage of the guard electrode. The controller defines the current flowing direction of the current flowing through the guard electrode to be a positive direction when the voltage of the main electrode is lower than the voltage of the guard electrode. The controller corrects the voltage of the main electrode based on the current flowing through the guard electrode so that a corrected voltage of the main electrode is set to be a passenger determination data. Even when a potential difference is generated between the main electrode and the guard electrode, the controller detects the capacitance of the passenger correctly.

Capacitive sensing systems which are used in the control of airbag systems or other safety-related applications may be considered as safety-relevant system components. It may thus be necessary to monitor the good functioning of the different components of the sensor (sensing electrode and/or guard electrode) in order to rule out a false reading by the capacitive occupancy or proximity detection system.

Specifically in Hands off Detection (HoD) systems, a guard electrode is often employed for shielding one or more sense electrodes from inner parts of a vehicle steering wheel. Any damage of an electric connection of the guard electrode to a signal-processing circuitry of a capacitive sensor system can jeopardize the reliability of measurement results of the capacitive sensor.

It has been proposed in the prior art to furnish capacitive measurement circuits with diagnostic means for detecting a capacitive sensor interruption, in particular a guard electrode interruption.

For instance, international application WO 2017/129552 A1 describes a capacitance measurement circuit for determining a sense current of a capacitive sensor with a sense electrode and a guard electrode. The capacitance measurement circuit comprises a periodic signal voltage source, a sense current measurement circuit configured for determining the sense current with reference to a reference voltage and at least one remotely controllable switch member. The configuration is such that in the first switching state, the at least one switch member electrically connects the sense current measurement circuit to the periodic measurement voltage for providing a first reference voltage, and in the second switching state, the at least one switch member electrically connects the sense current measurement circuit to a second reference voltage that is different from the first reference voltage. By intentionally changing the reference voltage used for determining the sense current by connecting the sense current measurement circuit to the second reference voltage that is different from the first reference voltage, a signal can be generated by the sense current measurement circuit that can be indicative of an electrical interruption, wherein the interruption may include any interruption of electrical connections between the respective sense and guard cabling and connecting members.

SUMMARY

It is therefore an object of the invention to provide an improved method of diagnosing the integrity of an electric connection of a guard electrode of a capacitive sensor in a capacitive sensing system, the method being as simple as possible and requiring as little additional hardware effort as possible. The method is suitable particularly for use in automotive applications, and is particularly suitable for multichannel capacitive sensing systems.

In one aspect of the present invention, the object may be achieved by a method of operating a capacitive sensing device for diagnosing a galvanic connection of at least one of guard electrodes of the capacitive sensing device.

The capacitive sensing device comprises at least one sense-guard capacitive sensor and a capacitive measurement circuit that is configured for determining a complex impedance of an unknown capacitance from a complex sense current flowing in the at least one sense-guard capacitive sensor. The at least one sense-guard capacitive sensor includes a first electrically conductive sense electrode and a first electrically conductive guard electrode and at least a second electrically conductive sense electrode, which is galvanically separated from the first sense electrode, and at least a second electrically conductive guard electrode, wherein each of the guard electrodes is proximally arranged to at least one of the sense electrodes and is galvanically separated from each of the sense electrodes.

It is noted herewith that the terms "first", "second", etc. are used in this application for distinction purposes only, and are not meant to indicate or anticipate a sequence or a priority in any way.

The proposed method comprises at least steps of:
providing an alternating electrical measurement signal to a first one of the at least two sense electrodes,
by operating the capacitive measurement circuit, determining a first complex sense current flowing in a second one of the at least two sense electrodes,
switching off the alternating electrical measurement signal to the first one of the at least two sense electrodes,
commencing to provide an alternating electrical measurement signal to the second one of the at least two sense electrodes,
by operating the capacitive measurement circuit, determining a second complex sense current flowing in the first one of the at least two sense electrodes,
calculating a difference of imaginary parts of the determined first and second complex sense currents,
comparing the calculated difference with at least one predetermined threshold for the difference of imaginary parts, and
based on an outcome of the step of comparing, determining a status of the galvanic connection of at least one of the guard electrodes.

The phrases "configured to" and "configured for", as used in this application, shall in particular be understood as being specifically programmed, laid out, furnished or arranged.

As is obvious to those skilled in the art, the complex sense current flowing through the sense electrodes is indicative of an unknown complex impedance that represents a position of an object relative to the sense electrode.

Capacitive coupling measurements between two sense electrodes, which are established by determining a complex receiving current in one sense electrode while providing the alternating electrical measurement signal to the other sense electrode and vice versa, of a capacitive sense-guard sensor in both directions can be utilized for distinguishing a properly galvanically connected guard electrode from a defective guard electrode connection. The complex receiving current is related to the capacitive coupling between both sense electrodes, with the guard electrodes being proximally arranged. Because of this, the difference of the imaginary parts of the sense currents determined in the capacitive coupling measurements should be about the same within some tolerance margin. In case that one of the guard electrodes is not properly galvanically connected, a portion of one sense electrode is not shielded anymore. As a consequence, the capacitive coupling between both sense electrodes changes. Furthermore, a difference of the two considered capacitive coupling measurements is load-independent, i.e. is independent from an unknown capacitance representing the object to be sensed. In this way, the integrity of the galvanic connection of the guard electrode of the capacitive sense-guard sensor can readily be diagnosed without requiring additional hardware.

The invention is, without being limited to, in particular beneficially employable in automotive applications using capacitive sensing, particularly in hands off detection systems and seat occupancy detection and/or classification systems, but may as well be used in any other technical field in which a capacitive sensing device with a guard electrode is used. The term "automotive", as used in this patent application, shall particularly be understood as being suitable for use in vehicles including passenger cars, trucks, semi-trailer trucks and buses.

In the case of more than two pairs of sense-guard electrodes, all sense electrodes are galvanically separated from each other, and each electrically conductive guard electrode is proximally arranged to at least one of the sense electrodes and is galvanically separated from each of the sense electrodes.

In types of capacitive sensing devices, in which the at least one sense-guard capacitive sensor comprises more than two electrically conductive sense electrodes and more than two electrically conductive guard electrodes, wherein each guard electrode is proximally arranged to at least one of the sense electrodes and is galvanically separated from each of the sense electrodes, in preferred embodiments of the method at least the aforementioned steps are carried out for each electrode unit that can be constituted from the at least two sense electrodes and the at least two guard electrodes and at least one other electrode unit that is adjacently arranged to the considered electrode unit. An electrode unit shall be defined as a sense electrode and a guard electrode proximally arranged to the sense electrode.

In this way, the integrity of the galvanic connection of all guard electrodes of the capacitive sense-guard sensor can be diagnosed in a fast manner.

In types of capacitive sensing devices, in which the at least one sense-guard capacitive sensor comprises more than two electrically conductive sense electrodes and more than two electrically conductive guard electrodes, wherein each guard electrode is proximally arranged to at least one of the sense electrodes and is galvanically separated from each of the sense electrodes, in preferred embodiments of the method at least the aforementioned steps are carried out for each pair of electrode units that can be constituted from the at least two sense electrodes and the at least two guard electrodes. Again, an electrode unit is considered as a combination of a sense electrode and a guard electrode that is proximally arranged to the sense electrode.

In this way, the integrity of the galvanic connection of all guard electrodes of the capacitive sense-guard sensor can be diagnosed in a manner that yields additional data for improving a statistical level of confidence.

In preferred embodiments, the method further includes a step of generating an output signal that is indicative of the determined status of the galvanic connection of the at least one of the guard electrodes. The output signal may beneficially be transferred, for instance and without being limited to, to an electronic control unit of a vehicle in order to assist in assessing a potential activation of an installed vehicle passenger restraint system such as an airbag.

In preferred embodiments of the method, for the at least one threshold value for the difference of imaginary parts of determined complex sense currents, tolerance margins are assigned. In this way, a wrong determination of the status of the galvanic connection due to a potential occurrence of signal noise can effectively be avoided.

Preferably, the aforementioned steps of the proposed method are executed in a periodic manner. In this way, an improper status of the galvanic connection of at least one of the guard electrodes can quickly be detected, and an execution of actions initiated by wrong capacitive sensing results by the capacitive sensing device can be prevented.

In another aspect of the invention, a capacitive sensing device is provided that comprises at least one sense-guard capacitive sensor, a capacitive measurement circuit and an evaluation and control unit.

The at least one sense-guard capacitive sensor includes a first electrically conductive sense electrode, a first electrically conductive guard electrode, at least a second electrically conductive sense electrode, which is galvanically separated from the first sense electrode, and at least a second electrically conductive guard electrode, wherein each one of the guard electrodes is proximally arranged to at least one of the sense electrodes and is galvanically separated from each of the sense electrodes.

The capacitive measurement circuit includes an alternating electrical measurement signal generator that is configured for providing an alternating measurement voltage, and current measurement means that are configured to determine complex sense currents flowing in the at least one sense-guard capacitive sensor. The capacitive measurement circuit is configured for determining a complex impedance of an unknown capacitance from the determined complex sense current.

The evaluation and control unit is configured for controlling specific functions of the capacitive measurement circuit and for automatically carrying out the steps of the method disclosed herein.

The capacitive sensing device is, without being limited to, in particular beneficially employable in automotive applications using capacitive sensing, particularly in hands off detection systems and seat occupancy detection and/or classification systems, but may as well be used in any other technical field in which a capacitive sensing device with a guard electrode is required.

The benefits described in context with the disclosed method of operating the capacitive sensing device apply to the capacitive sensing device itself to the full extent.

Preferably, the alternating electrical measurement signal is formed as a periodic electrical measurement voltage signal. Also preferably, the periodic electrical measurement signal has a fundamental frequency that lies in the range between 10 kHz and 100 MHz. The term "fundamental frequency", as used in this application, shall particularly be understood as a lowest sinusoidal frequency in a Fourier analysis of the respective periodic electrical measurement signal.

Preferably, the evaluation and control unit comprises a processor unit and a digital data memory unit to which the processor unit has data access. In this way, an automatic execution of the steps of the method and a fast and undisturbed, low-noise processing of signals within the evaluation and control unit can be accomplished.

In preferred embodiment of the capacitive sensing device, the at least one sense-guard capacitive sensor comprises more than two electrically conductive sense electrodes and more than two electrically conductive guard electrodes, each guard electrode being proximally arranged to at least one of the sense electrodes and being galvanically separated from each of the sense electrodes. Such capacitive sensing devices are beneficially employable in applications that require sensing coverage of an area with a certain local resolution.

In preferred embodiments of the capacitive sensing device, the capacitive measurement circuit and the at least one sense-guard capacitive sensor are configured to operate the at least one sense-guard capacitive sensor in coupling mode. In this way, a status of the galvanic connection of at least one of the guard electrodes can be obtained as a by-product from normal sensing operation of the capacitive sensing device.

In yet another aspect of the invention, a vehicle steering wheel with capacitive hands off detection is provided. The vehicle steering wheel comprises a capacitive sensing device as disclosed herein. The guard electrodes are arranged between an outer ring of the steering wheel and the sense electrodes, and are arranged to cover a major amount of an outer surface of the outer ring. The phrase "major amount", as used in this application, shall in particular be understood as more than 30%, preferably more than 50% and, more preferably, more than 70% of an outer surface of the steering wheel outer ring. The benefits described in context with the method of operating a capacitive sensing device apply to the proposed vehicle steering wheel to the full extent.

In a further aspect of the invention, a software module for controlling an automatic execution of steps of the method disclosed herein is provided.

The method steps to be conducted are converted into a program code of the software module, wherein the program code is implementable in a non-transitory computer-readable medium such as a digital data memory unit of the capacitive sensing device and is executable by a processor unit of the capacitive sensing device. Preferably, the digital data memory unit and/or processor unit may be a digital data memory unit and/or a processing unit of the capacitive sensing device. The processor unit may, alternatively or supplementary, be another processor unit that is especially assigned to execute at least some of the method steps.

The software module can enable a robust and reliable automatic execution of the method and can allow for a fast modification of method steps.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies the invention in particular in connection with the figures.

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 1:
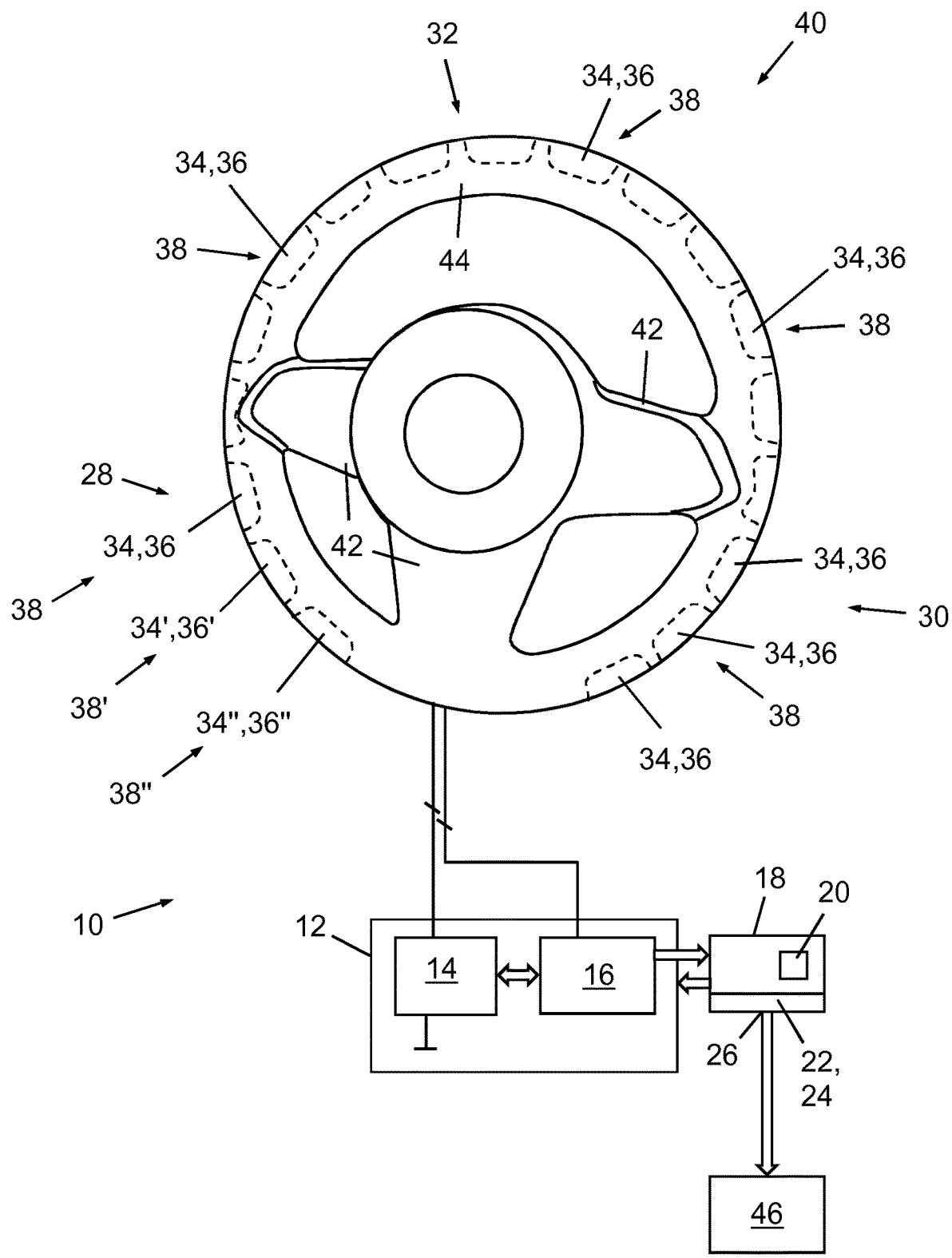
FIG. 1 schematically illustrates a vehicle steering wheel with capacitive hands off detection, comprising a capacitive sensing device in accordance with an embodiment of the invention, FIG. 2a schematically illustrates a configuration of sense electrodes and guard electrodes of a sense-guard capacitive sensor of the capacitive sensing device pursuant to FIG. 1 during determination of a status of galvanic connections of the guard electrodes with proper galvanic connections, FIG. 2b schematically illustrates the configuration pursuant to FIG. 2a in a cross-section view, FIG. 3a schematically illustrates a configuration of sense electrodes and guard electrodes of the sense-guard capacitive sensor pursuant to FIG. 2 during determination of a status of galvanic connections of the guard electrodes with one defective guard electrode galvanic connection, FIG. 3b schematically illustrates the configuration pursuant to FIG. 3a in a cross-section view.

FIG. 1 schematically illustrates a steering wheel 40 of a vehicle with capacitive hands off detection, comprising a capacitive sensing device 10 in accordance with an embodiment of the invention. The vehicle is formed as a passenger car. The vehicle steering wheel 40 comprises three spokes 42 connected to an outer ring 44. The capacitive sensing device 10 includes a first sense-guard capacitive sensor 28, a second sense-guard capacitive sensor 30 and a third sense-guard capacitive sensor 32.

The first capacitive sensor 28 includes three electrically conductive sense electrodes 34, 34', 34" and three electrically conductive guard electrodes 36, 36', 36" that are circumferentially arranged at the bottom left hand side along the outer ring 44 in a mutually spaced manner. The sense electrodes 34, 34', 34" and the guard electrodes 36, 36', 36" may be formed as printed metal electrodes attached on a flexible film carrier, as is well known in the art. Each one of the guard electrodes 36, 36', 36" is proximally arranged to one of the sense electrodes 34, 34', 34" and is galvanically separated from each of the sense electrodes 34, 34', 34" and the other guard electrodes 36, 36', 36", as is schematically illustrated in FIGS. 2 and 3. Each one of the sense electrodes 34, 34', 34" is galvanically separated from each of the other sense electrodes 34, 34', 34". An arrangement of an electrically conductive sense electrode 34, 34', 34" and an electrically conductive guard electrode 36, 36', 36" that is proximally arranged to the sense electrode 34, 34', 34" and galvanically separated from it may be considered an electrode unit 38, 38', 38" and may be referred to like this in the following. The guard electrodes 36, 36', 36" of the first capacitive sensor 28 are arranged between the outer ring 44 of the steering wheel 40 and the sense electrodes 34, 34', 34" for shielding the sense electrodes 34, 34', 34" from inner parts of the steering wheel 40. The vehicle steering wheel 40 comprises a leather trim that covers most part of the outer ring 44 and hides and protects the sense electrode 34, 34', 34" from external influences.

The second capacitive sensor 30 is identically designed to the first capacitive sensor 28. The three electrode units 38, 38', 38" are arranged at the bottom right-hand side of the steering wheel 40. The guard electrodes 36 of the second capacitive sensor 30 are arranged between the outer ring 44 of the steering wheel 40 and the sense electrodes 34 for shielding the sense electrodes 34 of the second capacitive sensor 30 from the inner parts of the steering wheel 40.

The third capacitive sensor 32 includes twelve electrode units 38 (of which only three are exemplarily assigned a reference numeral) that are circumferentially arranged along an upper half of the outer ring 44 in a mutually spaced manner. Each electrode unit 38 of the third capacitive sensor 32 is identically designed to an electrode unit 38 of the first capacitive sensor 28 and the second capacitive sensor 30. The guard electrodes 36 of the third capacitive sensor 32 are as well arranged between the outer ring 44 of the steering wheel 40 and the sense electrodes 34 for shielding the sense electrodes 34 of the third capacitive sensor 32 from the inner parts of the steering wheel 40.

The three capacitive sensors 28, 30, 32 form part of a multizone capacitive vehicle Hands off Detection (HoD) system. The guard electrodes 36 of the three sense-guard capacitive sensors 28, 30, 32 cover a major amount of an outer surface of the outer ring 44 of the vehicle steering wheel 40.

The capacitive sensing device 10 further comprises a capacitive measurement circuit 12. The capacitive measurement circuit 12 includes an alternating electrical measurement signal generator 14 that is configured for providing an alternating measurement signal. The capacitive measurement circuit 12 also comprises current measurement means 16 that are configured to determine complex sense currents flowing in the sense-guard capacitive sensors 28, 30, 32. The current measurement means 16 may include one or more transimpedance amplifiers (TIA) whose function is to convert the complex sense current into an output voltage that is proportional to the determined sense current. The capacitive measurement circuit 12 is configured for determining a complex impedance of an unknown capacitance from the determined complex sense current and the provided alternating measurement voltage. The unknown complex impedance represents a position of an object relative to one of the sense electrodes 34.

In this specific embodiment, the alternating measurement signal is formed as a periodic electrical measurement voltage, namely a sinusoidal measurement voltage. Also, the periodic electrical measurement voltage has a fundamental frequency of about 15 MHz. In other possible embodiments, the alternating measurement signal generator may be configured to generate an alternating electrical measurement signal of different signal shape, such as a square waveform, at a different fundamental frequency.

In this specific embodiment, the capacitive measurement circuit 12 and the three sense-guard capacitive sensors 28, 30, 32 are configured to operate the three sense-guard capacitive sensors 28, 30, 32 in coupling mode.

Moreover, the capacitive sensing device 10 includes an evaluation and control unit 18. The evaluation and control unit 18 is connected to the capacitive measurement circuit 12 for receiving data signals representing complex impedances that have been determined by the capacitive measurement circuit 12. The evaluation and control unit 18 is further configured for controlling specific functions of the capacitive measurement circuit 12, and appropriate control lines are established.

The capacitive measurement circuit 12 and the evaluation and control unit 18 are installed in the vehicle. An output port 26 of the evaluation and control unit 18 is data interconnected with an ADAS 46 of the vehicle.

Figure 5:
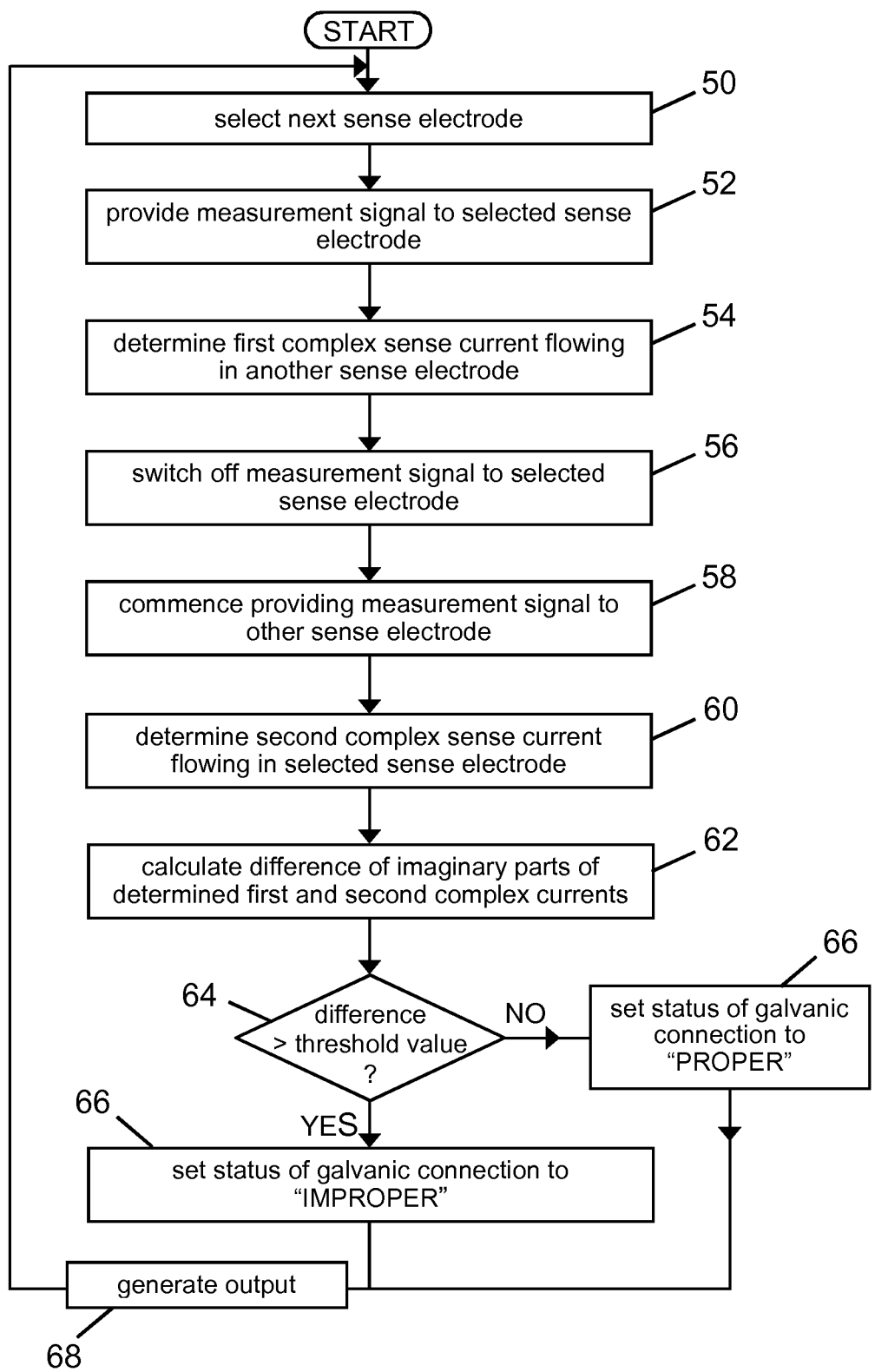
FIG. 5 is a flow chart of a possible embodiment of the method of operating the capacitive sensing device pursuant to FIG. 1 for diagnosing a galvanic connection of the guard electrodes.

In the following, an embodiment of a method of operating the capacitive sensing device 10 pursuant to FIG. 1 for diagnosing galvanic connections of the guard electrodes 36 will be described using FIGS. 1 and 5. A flowchart of the method is provided in FIG. 5. In preparation of operating the capacitive sensing device 10, it shall be understood that all involved units and devices are in an operational state and configured as illustrated in FIG. 1.

In order to be able to automatically and periodically carry out the method, the evaluation and control unit 18 comprises a software module 24 (FIG. 1). The method steps to be conducted are converted into a program code of the software module 24. The program code is implemented in a digital data memory unit 22 of the evaluation and control unit 18 and is executable by a processor unit 20 of the evaluation and control unit 18. Alternatively, the software module 24 may as well reside in and may be executable by a control unit of the vehicle, for instance an electronic control unit of a lane departure warning system, and established data communication means between the evaluation and control unit 18 and the control unit of the lane departure warning system of the vehicle would be used for enabling mutual data transfer.

The evaluation and control unit 18 may comprise a microcontroller that includes the processor unit 20, the digital data memory unit 22, and further includes a microcontroller system clock and a plurality of control outputs for remotely controlling the remotely controllable capacitive measurement circuit 12. Such equipped microcontrollers are commercially available nowadays in many variations and at economic prices.

The steps of the method are the same for each one of the three guard-sense capacitive sensors 28, 30, 32. Therefore, it will suffice to describe the steps of the method exemplarily for one of the guard-sense capacitive sensors 28, 30, 32, namely the first capacitive sensor 28.

In a first step 50 of the method, one sense electrode 34 of the three sense electrodes 34, 34', 34" is selected. In the following step 52, the periodic electrical measurement signal is provided to the selected first one 34 of the three sense electrodes 34, 34', 34" of the first capacitive sensor 28. Then, in a next step 54, a first complex sense current flowing in a second one 34' of the three sense electrodes 34, 34', 34" is determined by operating the capacitive measurement circuit 12. In another step 56, the periodic electrical measurement signal to the first sense electrode 34 is switched off. Then, it is commenced to provide the periodic electrical measurement signal to the second one 34' of the three sense electrodes 34, 34', 34" in a next step 58. In a following step 60, a second complex sense current flowing in the first sense electrode 34 is determined by operating the capacitive measurement circuit 12.

Figure 2A:
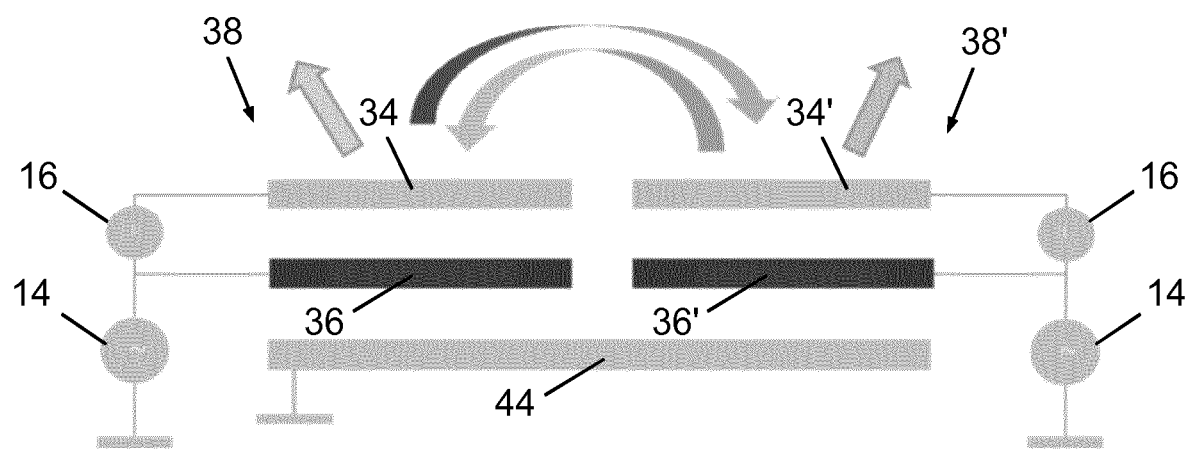
Figure 2B:
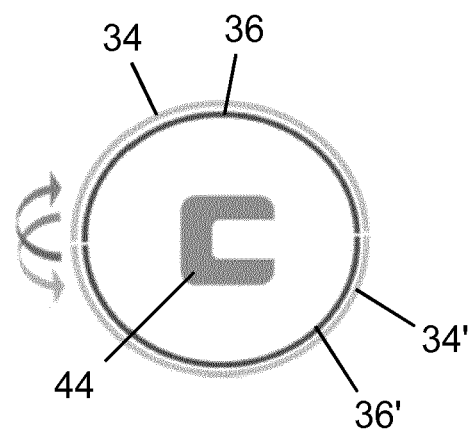
Figure 3A:
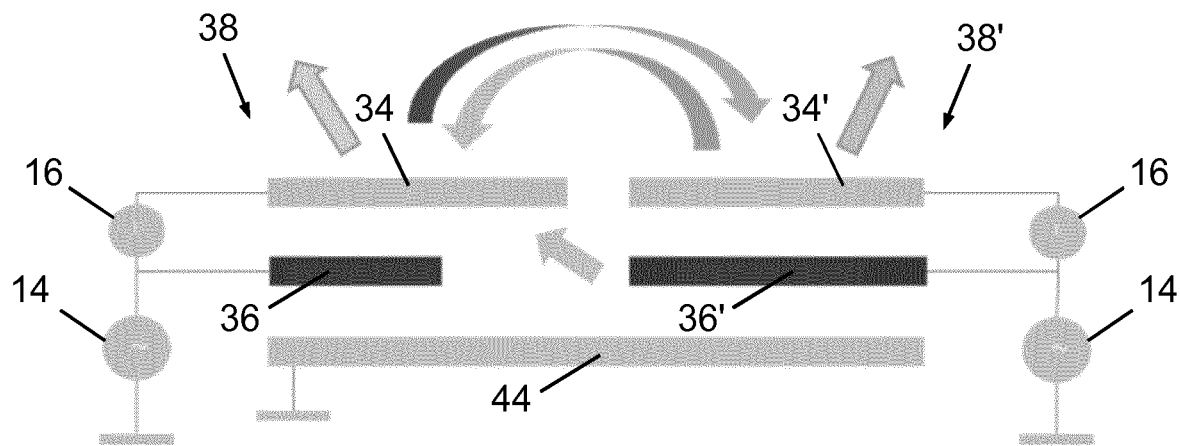
Figure 3B:
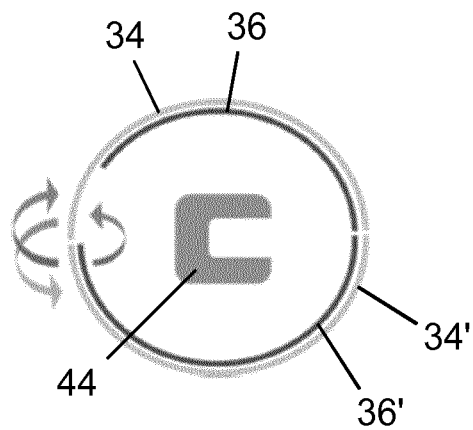

A configuration of the first electrode unit 38 and the second electrode unit 38'; i.e. in particular the first sense electrode 34 and the second sensor electrode 34' during execution of the above-mentioned steps of the method is illustrated in FIGS. 2a, 2b and FIG. 3a, 3b. In FIG. 2a, the upper arrow in the middle symbolizes the situation in which the first sense electrode 34 is provided with the periodic electrical measurement signal, driving a first complex sense current through the second sensor electrode 34'. The lower arrow in the middle symbolizes the situation in which the second sense electrode 34' is provided with the periodic electrical measurement signal, driving a second complex sense current through the first sensor electrode 34. FIG. 2b schematically shows the second guard electrode 36' proximately arranged to the second sense electrode 34', wrapped around the outer ring 44 of the steering wheel 40 and in a state of proper galvanic connection. In FIGS. 3a and 3b, the first guard electrode 36 is shown to be in a state of improper galvanic connection and is, thus, capacitively coupled to the first sense electrode 34.

In another step 62, a difference of imaginary parts of the determined first and second complex sense currents is calculated. In a following step 64, the calculated difference of the imaginary parts of the determined first and second complex sense currents is compared with a predetermined threshold for the difference of imaginary parts of the complex sense currents. Based on an outcome of the step 64 of comparing, a status of the galvanic connection of the guard electrodes 36, 36' is determined in the next step 66. If the calculated difference exceeds the predetermined threshold value, a status of the galvanic connection is set to "IMPROPER". If the calculated difference is smaller than or equal to the predetermined threshold value, the status of the galvanic connection is set to "PROPER". In another step 68, output signals are generated by the evaluation and control unit 18 at its output port 26 that are indicative of the determined status of the galvanic connections of the three guard electrodes 34, 34'. The output signals are thus transferred to the ADAS 46 of the vehicle for further use.

In next iterations, the aforementioned steps 50-68 are executed for each one of the three electrode units 38, 38', 38" and one of the other electrode units 38, 38', 38" that is adjacently arranged to the considered electrode unit 38, 38', 38". In case of the first sense-guard capacitive sensor 28 having three electrode units 38, 38', 38", the first iteration would be the aforementioned execution of the steps at the first electrode unit 38 and the second electrode unit 38', and the second iteration would be an execution of the steps at the second electrode unit 38' and the third electrode unit 38". By that, a galvanic connection of each one of the three guard electrodes 38, 38', 38" of the first capacitive sensor 28 would have been diagnosed.

Alternatively, in next iterations the aforementioned steps may be executed for each pair of electrode units 38, 38', 38" that can be constituted from the existing electrode units 38, 38', 38". In case of the first sense-guard capacitive sensor 28 having three electrode units 38, 38', 38", the first iteration would be the aforementioned execution of the steps at the first electrode unit 38 and the second electrode unit 38', the second iteration would be an execution of the steps at the second electrode unit 38' and the third electrode unit 38", and the last iteration would be an execution of the steps at the first electrode unit 38 and the third electrode unit 38". By that, a galvanic connection of each one of the three guard electrodes 36, 36', 36" of the first capacitive sensor 28 would have been diagnosed, yielding additional data, which can be used for improving a statistical level of confidence.

The described execution of steps is repeated in a periodic manner and may depend on the specific application of the capacitive sensing device 10. In this specific embodiment, the repetition rate is selected to be about 3 Hz. In other embodiments, the repetition rate may be selected higher than 3 Hz.

Figure 4:
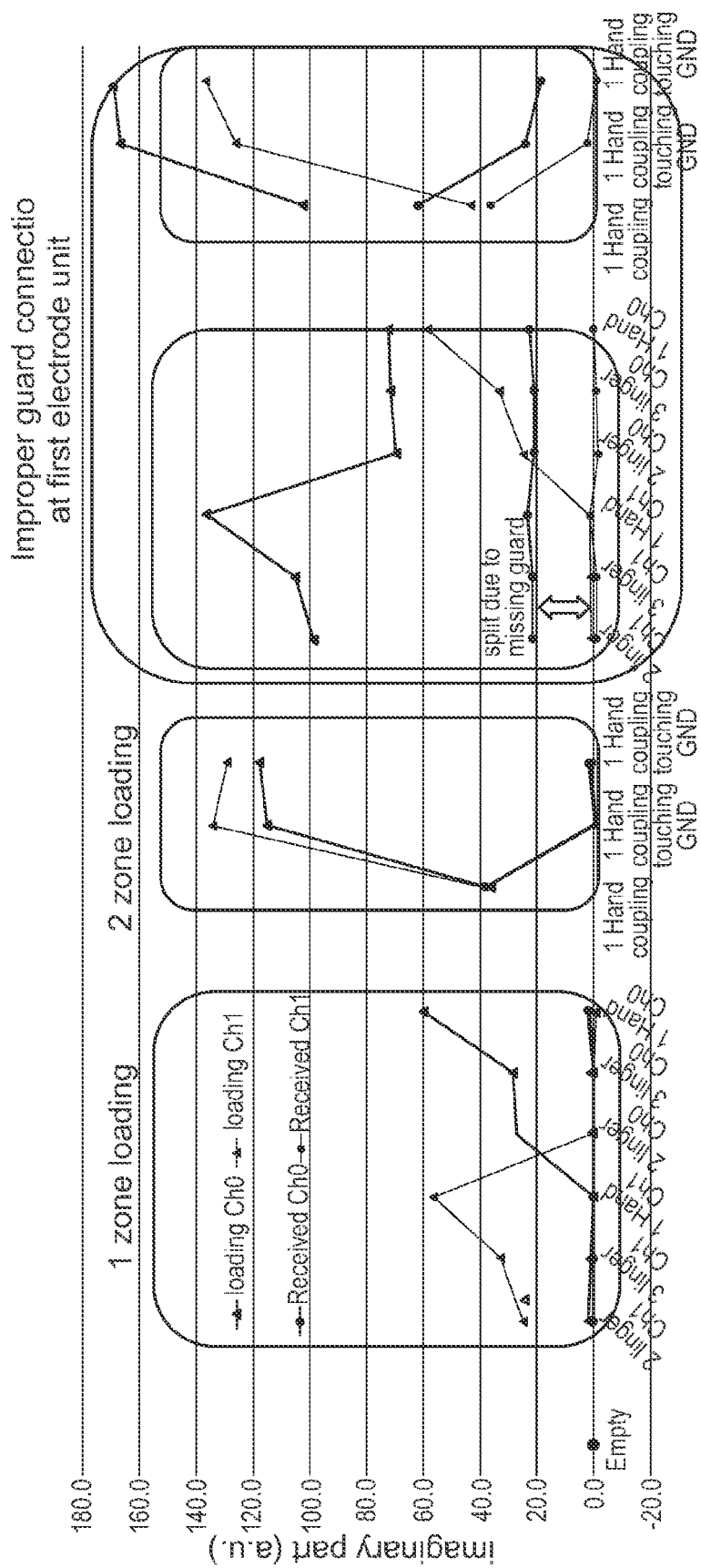
FIG. 4 shows experimental results obtained with the capacitive sensing device pursuant to FIG. 1.

FIG. 4 shows experimental results obtained with the capacitive sensing device 10 pursuant to FIG. 1, which clearly show a shift in magnitude of the imaginary part of the determined complex impedance in case that a galvanic connection of at least a portion of one of the guard electrodes 36 is improper (FIGS. 3a and 3b) and is, for instance, lost. Also, it can clearly be extracted from the plots shown in FIG. 4 that the observed shift is independent of a capacitive load on the sense-guard capacitive sensor 28, 30, 32, i.e. is independent of how large a portion of a driver's hand is approaching the sense-guard capacitive sensor 28, 30, 32, which is a prerequisite for a unique and reliable detection of an improper galvanic connection of a guard electrode 36, 36', 36" by detection of a shift in magnitude of the determined complex impedance.

The invention claimed is:

1. A method of operating a capacitive sensing device comprising at least one sense-guard capacitive sensor and a capacitive measurement circuit that is configured for determining a complex impedance of an unknown capacitance from a complex sense current flowing in the at least one sense-guard capacitive sensor, the at least one sense-guard capacitive sensor including a first electrically conductive sense electrode and a first electrically conductive guard electrode and at least a second electrically conductive sense electrode, which is galvanically separated from the first sense electrode, and at least a second electrically conductive guard electrode, wherein each of the guard electrodes is proximally arranged to at least one of the sense electrodes and is galvanically separated from each of the sense electrodes, said method comprising at least steps of:

providing (52) an alternating electrical measurement signal to a first one of the at least two sense electrodes, by operating the capacitive measurement circuit, determining (54) a first complex sense current flowing in a second one of the at least two sense electrodes, switching off (56) the alternating electrical measurement signal to the first one of the at least two sense electrodes, commencing (58) to provide an alternating electrical measurement signal to the second one of the at least two sense electrodes, by operating the capacitive measurement circuit, determining (60) a second complex sense current flowing in the first one of the at least two sense electrodes, calculating (62) a difference of imaginary parts of the determined first and second complex sense currents, comparing (64) the calculated difference with at least one predetermined threshold for the difference of imaginary parts, and based on an outcome of the step (64) of comparing, determining (66) a status of the galvanic connection of at least one of the guard electrodes.

2. The method as claimed in claim 1, wherein the at least one sense-guard capacitive sensor comprises more than two electrically conductive sense electrodes and more than two electrically conductive guard electrodes, each guard electrode being proximally arranged to at least one of the sense electrodes and being galvanically separated from each of the sense electrodes, and wherein at least the steps 52-66 are carried out for each electrode unit that can be constituted from the at least two sense electrodes and the at least two guard electrodes, wherein an electrode unit shall be defined as a sense electrode and a guard electrode proximally arranged to the sense electrode, and at least one other electrode unit that is adjacently arranged to the considered electrode unit.

3. The method as claimed in claim 1, wherein the at least one sense-guard capacitive sensor comprises more than two electrically conductive sense electrodes and more than two electrically conductive guard electrodes, each guard electrode being proximally arranged to at least one of the sense electrodes and being galvanically separated from each of the sense electrodes, and wherein at least the steps 52-66 are carried out for each pair of electrode units, wherein an electrode unit consists of a sense electrode and a guard electrode proximally arranged to the sense electrode, that can be constituted from the at least two sense electrodes and the at least two guard electrodes.

4. The method as claimed in claim 1, further comprising a step (68) of generating an output signal that is indicative of the determined status of the galvanic connection of the at least one of the guard electrodes.

5. The method as claimed in claim 1, wherein at least the steps 52-66 are executed in a periodic manner.

6. A capacitive sensing device, comprising:
   at least one sense-guard capacitive sensor, including:
   a first electrically conductive sense electrode,
   a first electrically conductive guard electrode,
   at least a second electrically conductive sense electrode, which is galvanically separated from the first sense electrode,
   at least a second electrically conductive guard electrode, wherein each one of the guard electrodes is proximally arranged to at least one of the sense electrodes and is galvanically separated from each of the sense electrodes,
   a capacitive measurement circuit including an alternating electrical measurement signal generator that is configured for providing an alternating measurement signal and current measurement means that are configured to determine complex sense currents flowing in the at least one sense-guard capacitive sensor, wherein the capacitive measurement circuit is configured for determining a complex impedance of an unknown capacitance from the determined complex sense current, and
   an evaluation and control unit that is configured for controlling specific functions of the capacitive measurement circuit and for automatically carrying out at least the steps (50-66) of the method as claimed in claim 1.

7. The capacitive sensing device as claimed in claim 6, wherein the at least one sense-guard capacitive sensor comprises more than two electrically conductive sense electrodes and more than two electrically conductive guard electrodes, each guard electrode being proximally arranged to at least one of the sense electrodes and being galvanically separated from each of the sense electrodes.

8. The capacitive sensing device as claimed in claim 6, wherein the capacitive measurement circuit and the at least one sense-guard capacitive sensor-are configured to operate the at least one sense-guard capacitive sensor in coupling mode.

9. A vehicle steering wheel with capacitive hands off detection, comprising a capacitive sensing device as claimed in claim 6, wherein the guard electrodes are arranged between an outer ring of the steering wheel and the sense electrodes and are arranged to cover a major amount of an outer surface of the outer ring.

10. A software module for automatically carrying out the method as claimed in claim 1, wherein the method steps 52-66 to be conducted are converted into a program code of the software module, wherein the program code is implementable in a digital data memory unit of the capacitive sensing device or a separate control unit and is executable by a processor unit of the capacitive sensing device or the separate control unit.

\* \* \* \* \*